United States Patent [19]

Kiyokawa et al.

[11] Patent Number: 4,825,382
[45] Date of Patent: Apr. 25, 1989

[54] NUMERICAL CONTROL PROGRAM EDITING AND STORAGE IN RAM AND ROM

[75] Inventors: Morio Kiyokawa; Akihiko Fujimoto, both of Aichi, Japan

[73] Assignee: Mitsubishi Denki Kabushiki Kaisha, Tokyo, Japan

[21] Appl. No.: 597,624

[22] Filed: Apr. 6, 1984

[30] Foreign Application Priority Data

Apr. 12, 1983 [JP] Japan ................................ 58-64016

[51] Int. Cl.$^4$ ............................................. G06F 15/46
[52] U.S. Cl. .................................. 364/474.01; 364/900
[58] Field of Search ............................. 364/900, 200

[56] References Cited

U.S. PATENT DOCUMENTS

| 4,019,175 | 4/1977 | Nakao et al. | 364/900 |
| 4,156,928 | 5/1979 | Inose et al. | 364/900 |
| 4,441,164 | 4/1984 | Pavan et al. | 364/900 |
| 4,443,865 | 4/1984 | Schultz et al. | 364/900 |

Primary Examiner—John R. Lastova
Attorney, Agent, or Firm—Sughrue, Mion, Zinn, Macpeak & Seas

[57] ABSTRACT

A numerical control system including an input unit, a control unit, a memory, a processing unit, a setting and display unit, and an output unit, the memory unit including a first ROM region for storing and edited program produced by editing a machining program entered through the input unit in the memory, and a second ROM region for storing a program for writing the edited program into the first ROM region under a writing command entered through the setting and display unit.

2 Claims, 1 Drawing Sheet

NUMERICAL CONTROL PROGRAM EDITING AND STORAGE IN RAM AND ROM

BACKGROUND OF THE INVENTION

The present invention relates to a numerical control system having a memory capable of permanently storing an edited program with ease on the part of a user.

FIG. 1 of the accompanying drawings is a block diagram of a conventional numerical control system (hereinafter referred to as an "NC system") having an editing capability. In FIG. 1, a machining program in the form of an NC language is stored on an NC tape (or a cassette tape). The NC system includes an input unit 2 containing a readout circuit, a command interpreter circuit, and other circuits, a control unit 3, a memory 4, a processing unit 5, a setting and display unit 6 including a keyboard and a display such as CRT, and an output unit 7. Designated at 8 is a new edited machining tape (or a cassette tape).

The NC system with an editing capability of the above construction is used as follows: Based on the machining program loaded from the NC tape through the input unit 2, the processing unit 5 performs necessary processing operations under the control of the control unit 3. Resultant processed data are then temporarily stored in a RAM region 4A of the memory 4, and are edited by operating on the setting and display unit 6 normally using a high-level language such as BASIC. An edited program as a result of such editing operation is stored in the RAM region 4A.

The data on the edited program are then successively read out of the RAM region 4A through the output unit 7 for controlling a machine tool or for delivery to another NC system. When it is desired to store the edited program permanently, the signals delivered through the output unit 7 are punched into the NC tape 8 or stored in the cassette tape.

Since the edited program is stored in the RAM region in the conventional NC system, the edited program cannot be stored permanently within the NC system. Permanent storage of the edited program should therefore be made on the NC tape 8 (or cassette tape). Therefore, a tape puncher or a magnetic recording unit is required. Storage of the edited program in the RAM region is disadvantageous in that the stored program may inadvertently be destroyed through an error of the operator. When the power supply for the NC system is kept off for a long period of time, the stored edited program is erased and hence will not be available for use. Where the edited program is stored on the NC tape 8 or the cassette tape, it has to be loaded again into the RAM region for use, resulting in a time-consuming procedure. Storage of the edited program on ROM card requires a device for writing the program into a separate ROM.

SUMMARY OF THE INVENTION

With the above prior problem in view, it is an object of the present invention to enable the user to write an edited program easily into a ROM region in a memory in an NC system.

According to the present invention, there is provided a numerical control system comprising an input unit, a control unit, a memory, a processing unit, a setting and display unit, and an output unit, the memory unit including a first ROM region for storing an edited program produced by editing a machining program entered through the input unit in the memory, and a second ROM region for storing a program for writing the edited program into the first ROM region under a writing command entered through the setting and display unit.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
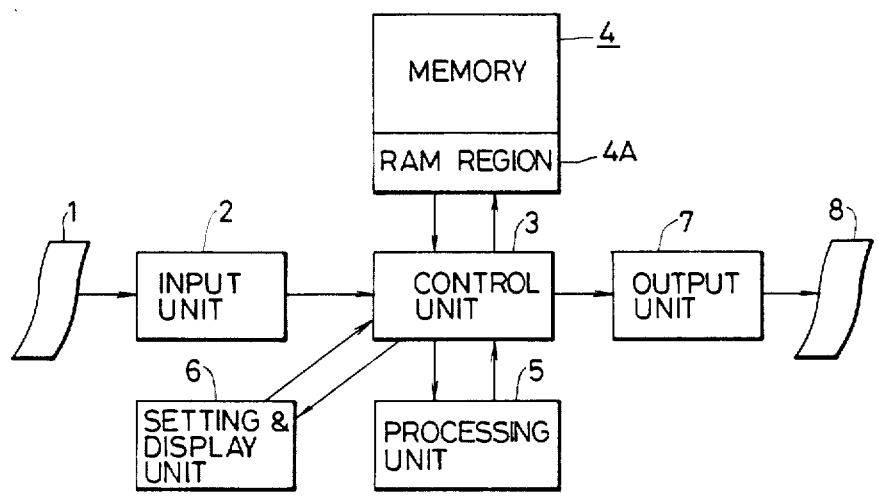
FIG. 1 is a block diagram of a conventional NC system.
Figure 2:
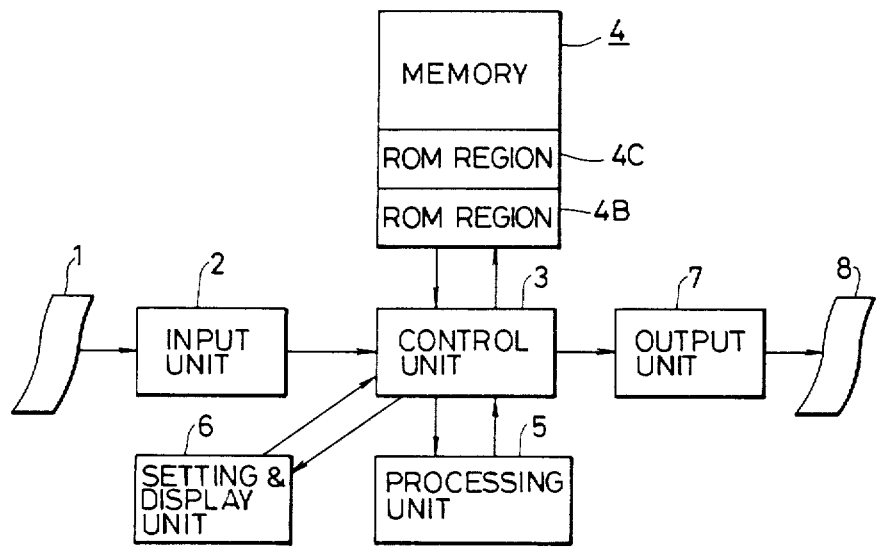
FIG. 2 is a block diagram of an NC system according to the present invention.

FIG. 2 illustrates an NC system according to the present invention, which has a memory 4 having a structure different from that of the memory 4 of the conventional NC system shown in FIG. 1. The memory 4 of FIG. 2 includes a ROM region 4B and a ROM region 4C for storing a program to write a program into the ROM region 4B. The other structure of the memory 4 of FIG. 2 is the same as that of the memory 4 of FIG. 1.

Operation of the NC system shown in FIG. 2 is as follows:

The machining program on the NC tape 1 is entered through the input unit 2 and edited by the setting and display unit 6 in the same manner as described with reference to FIG. 1.

First, a RAM card (not shown) is inserted into the ROM region 4B. Then, the machining program on the NC tape 1 is loaded through the input unit 2 into a RAM region 4A in the inserted RAM card. Thereafter, the setting and display unit 6 is operated to edit the machining program, and the edited program is stored in the RAM region 4A in the RAM card. The edited machining program is then stored from the RAM region 4A in the RAM card through the output unit 7 onto a cassette tape coupled to the output unit 7. Then, the RAM card is removed from the ROM region 4B, and a ROM card (not shown) is inserted into the ROM region 4B. Subsequently, the cassette tape in which the edited program is stored is coupled to the input unit 2. An instruction for writing the edited program into the ROM is entered through the setting and display unit 6 to write the edited program stored on the cassette tape into the ROM region 4B in the ROM card under the control of the ROM writing program stored in the ROM region 4C in the memory 4. Accordingly, the edited program is written into- the ROM region 4B in the memory 4.

The edited program can also be stored on the NC tape 1 as in the conventional manner. Programs other than the machining program can also be stored in the same manner as described above.

With the present invention, as described, an NC system of the invention has a memory including a ROM region for storing an edited program and another ROM region for storing a program to write the edited program into the first-mentioned ROM region. The edited program can easily be stored permanently in the memory by the user through the operation of a setting and display unit.

Accordingly, any general-purpose program that the user has prepared will be prevented from being destroyed or erased upon the occurrence of an operating error on the part of the user or accidental power failure. Since it is not necessary to provide a separate ROM writing device, the cost of the NC system is reduced.

Although a certain preferred embodiment has been shown and described, it should be understood that many changes and modifications may be made therein without departing from the scope of the appended claims.

We claim:

1. A numerical control system comprising:
   an input unit,
   a control unit,
   a memory unit,
   a processing unit,
   a setting and display unit,
   an output unit, and
   an external storage unit receiving the output of said output unit and said input receiving the output of said external storage unit,
   said memory unit including a RAM, a first ROM for storing an edited program produced by editing a machining program entered through said input unit into said RAM in said memory unit, said edited program being stored through said output unit to said external storage unit, and a second ROM for storing a program for writing said edited program into said first ROM from said external storage unit through said input unit under a writing command entered through said setting and display unit, said first ROM being physically replaceable with said RAM in said memory unit.

2. A method for editing a machining program in a numerical control system, comprising the steps of:
   inserting a RAM memory into a first ROM memory region of a memory unit;
   loading a machining program through an input unit said inserted RAM memory;
   operating a setting unit for editing the machining program and storing said edited machining program into said RAM memory;
   shifting said edited machining program from said RAM memory through an output unit to storage means;
   removing said RAM memory from said first ROM region of said memory unit;
   inserting a ROM memory into said first ROM region;
   supplying said edited machining program from said storage means into said input unit; and
   entering an instruction command for writing the edited machining program into said inserted ROM memory in said first ROM memory region from said input unit under the control of a ROM writing program stored in a second ROM region of said memory unit.

* * * * *